Feb. 21, 1967
HIROSHI HAKATA ET AL
APPARATUS FOR AUTOMATICALLY MEASURING
THE MOVEMENT OF AN ANIMAL
Filed Aug. 23, 1965
3,304,911
7 Sheets-Sheet 1
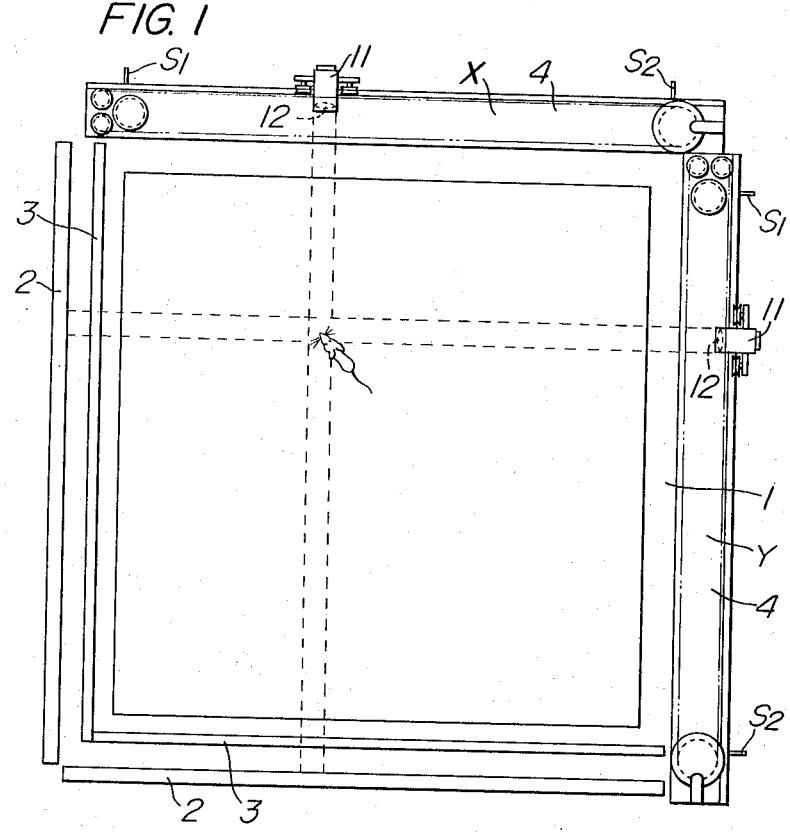
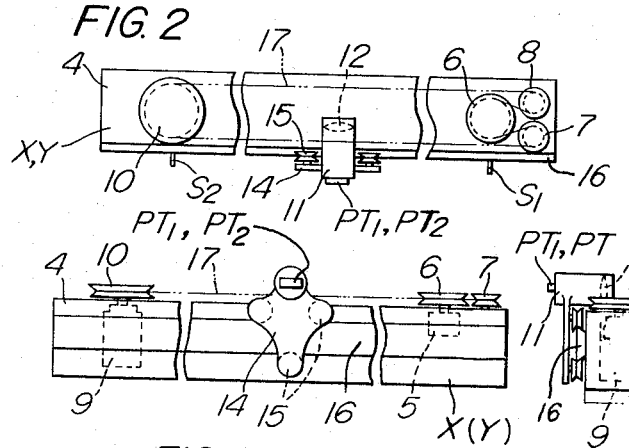
H. HAKATA
K. MAEDA, AND
K. HIGUCHI
INVENTORS
BY Wenderoth, Lind & Ponack
ATTORNEYS M ⊥ --- Pen-lift of X-Y recorder
M ⊥ --- Pen-lift of autographic oscilloscope for acceleration
M ⊥ --- Pen-lift of autographic oscilloscope for velocity
M ⊥ --- Moved distance measuring circuit 6AU6 G₁ short-circuited

H. HAKATA, K. MAEDA, AND K. HIGUCHI
INVENTORS

BY Wenderoth, Lind & Ponack
ATTORNEYS

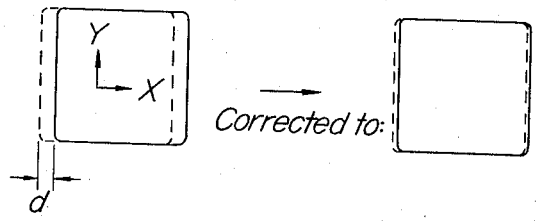
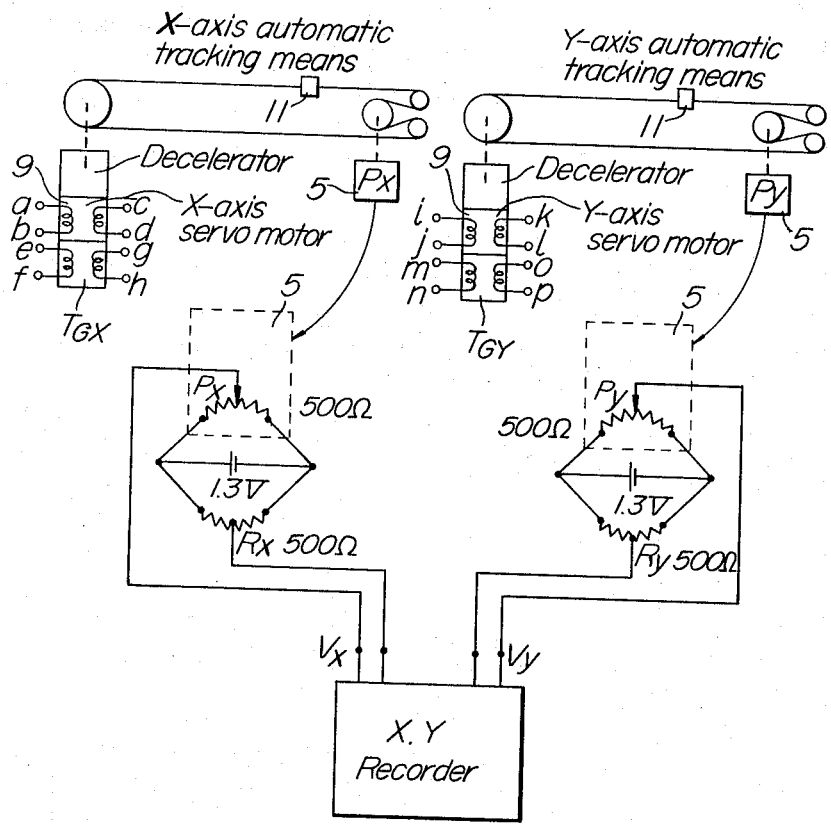

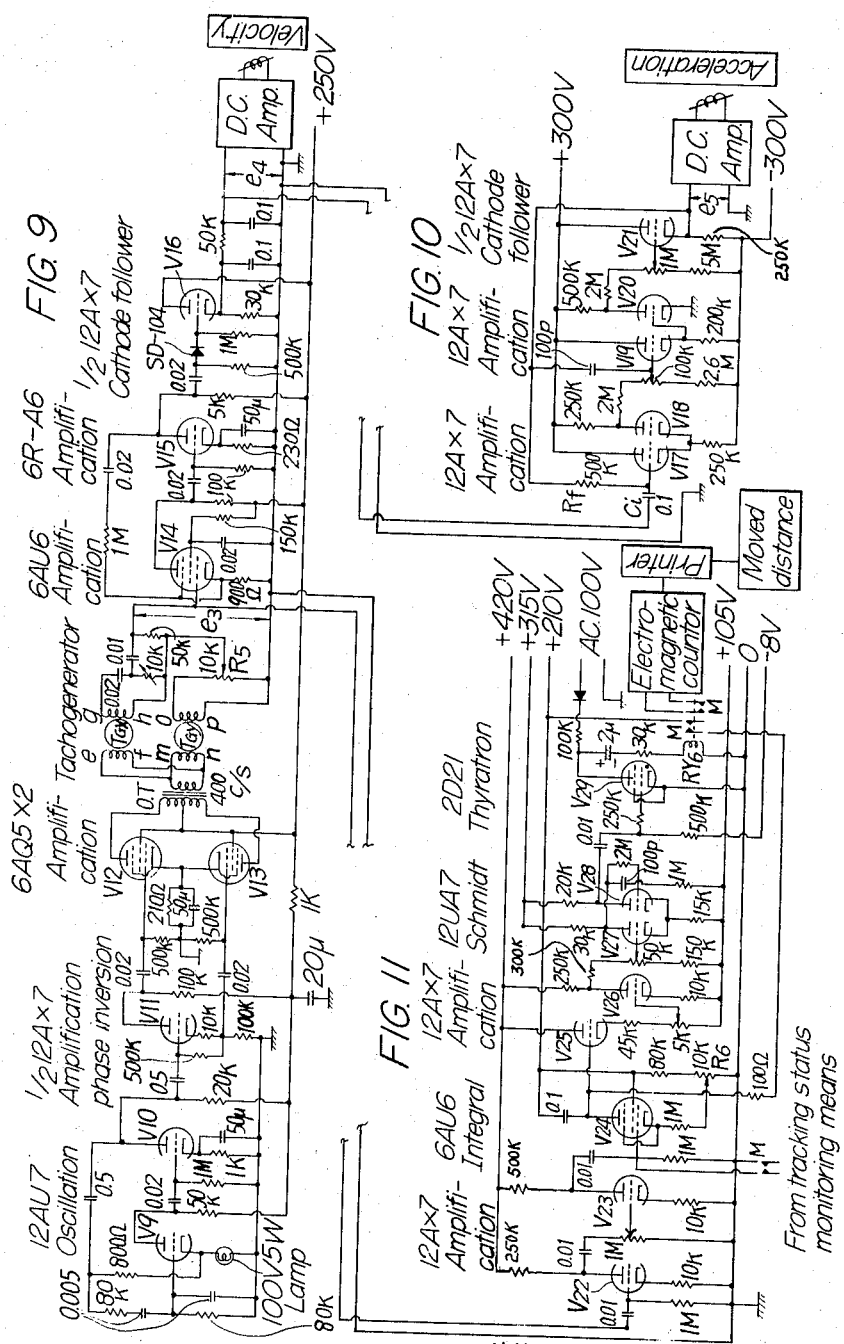

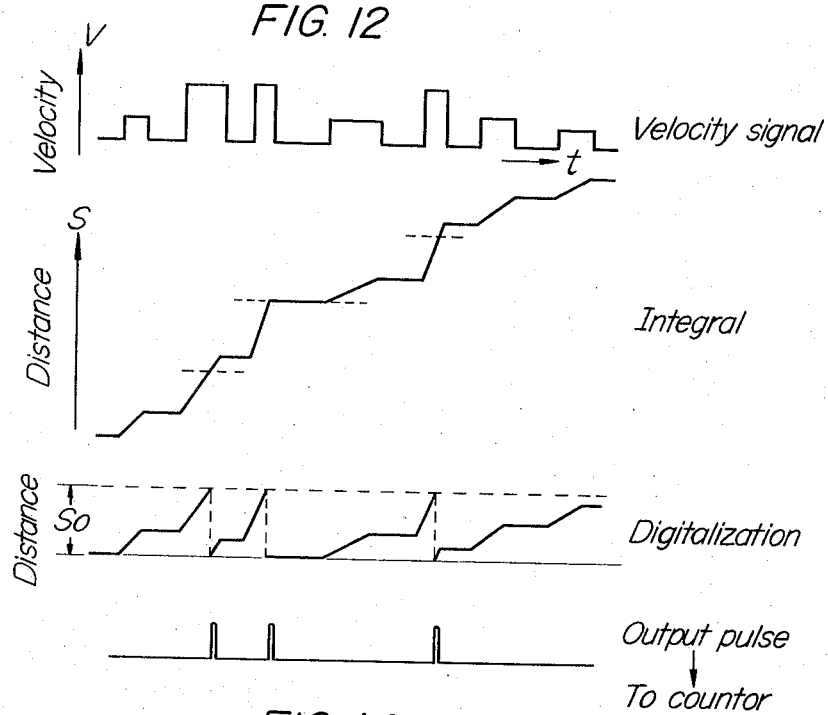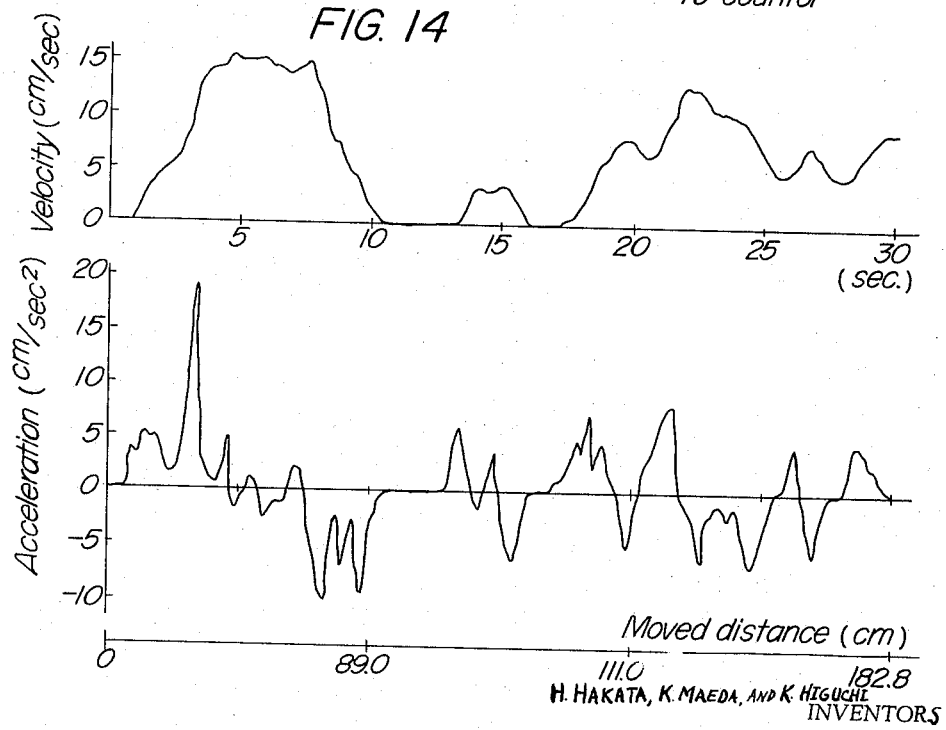

United States Patent Office 3,304,911
Patented Feb. 21, 1967

3,304,911
APPARATUS FOR AUTOMATICALLY MEASURING THE MOVEMENT OF AN ANIMAL
Hiroshi Hakata, Nara-shi, Keizo Maeda, Kobe, and Katsumi Higuchi, Osaka, Japan, assignors to Shionogi & Co., Ltd., Osaka, Japan, a corporation of Japan
Filed Aug. 23, 1965, Ser. No. 481,473
Claims priority, application Japan, Aug. 24, 1964, 39/48,295
11 Claims. (Cl. 119—1)

The present invention relates to an apparatus for automatically measuring the movements of animals and more particularly to an apparatus which accurately measures and takes precise records on four items, that is, 1, the locus of movements; 2, the velocity of movements; 3, the acceleration of movements; and 4, the accumulated distance of the movements, in an animal test intended for observation of the status of the movements (spontaneous movements) of an animal (especially of a small animal such as a mouse, a rat, or the like) after the animal has been injected with a drug such as morphine, caffein or other existing drugs or those which would be developed in the future, which primarily effects the central nervous system of animals.

There have been proposed, in the prior art, a couple of apparatuses intended for conducting this type of test. However, all of these devices in the prior art have been found to be quite rudimentary in nature and have not been satisfactory either, from the viewpoint of conducting a precise and complete measurement of the movements made by the animal under test. For example, one of such prior devices employs cage rotation method in which a test animal such as a mouse is made to run in a water-wheel type rotating cage to measure the amount of movements of the animal by the number of the rotations of the cage which is caused by the animal. Another example employs a cage oscillation method in which an animal is placed in a suspended cage to measure the amount of the animal's movements by measuring the amount of oscillation of the cage produced by the animal's movement. Still another example employs photo-cell method in which beams of light of a network pattern are projected into the cage in which an animal to be tested is enclosed, and the amount of the movements is measured from the electric signals produced when the beams are interrupted partially by the body of the test animal. However, no precise measurement may be expected from any of these devices in the prior art. For example, in the photo-cell method, if even a part of the beams happens to be interrupted by the moving tail of the encaged animal, a record is made just as if there had been movement of the whole animal, and on the other hand, the movements which took place within the area in which the beams are not interrupted will not be measured. Recently, a few attempts have been made to observe the locus of movements, which include a sooted paper method in which a mouse is placed on a sheet of sooted paper on which a cover is mounted to restrict the space of the animal's movement; the loci of the movements are observed from the footmarks produced on the sheet. Another example of such attempts is found in a photographic method intended for detection of the loci of the movements of a mouse in which the photographs of the mouse confined in a cage are taken from above the mouse at predetermined intervals of time by exposing films for a prolonged period of time, e.g. for 5 minutes. Both of these methods lack in the clearness results and therefore no precise study may be made by these methods.

Therefore, the object of the present invention is to provide an apparatus which is by far superior to conventional apparatuses in that it automatically takes a precise and clear record of the locus of movements and at the same time measures and registers the accurate velocity, acceleration and the accumulated distance of the movements by making use of additional apparatuses. The principal arrangement of the apparatus of the present invention includes the following means:

(1) An automatic tracking means and an electrical means for driving it.
(2) A tracking status monitoring means.
(3) A locus recording means.
(4) A moving velocity measuring and recording means.
(5) An acceleration measuring and recording means.
(6) A moved distance measuring and recording means.

A detailed description of the respective means as listed above will be made as the specification proceeds. The foregoing as well as other objects and advantages of this invention will be more clearly understood from the following detailed description when taken in conjunction with the accompanying drawings in which:

FIG. 1 is a plan view showing the structure of the field of the movements of a test animal;

FIGS. 2, 2A and 2B are respectively a plan view, a front view and a side elevational view of an automatic tracking means;

FIG. 6 is a diagram showing a situation in which miss-tracking is uncorrected and corrected;

FIG. 8 is a diagram of a locus recording means;

FIG. 9 is a circuit diagram of a velocity measuring and recording means;

FIG. 10 is a circuit diagram of an acceleration measuring and recording means;

FIG. 11 is a circuit diagram of an accumulated moved distance measuring and recording means;

FIG. 12 is an illustration showing how the moved distance is measured;

FIG. 14 shows an example of a diagram of velocity, acceleration, and moved distance recorded by the apparatus of the present invention.

Figure 3:
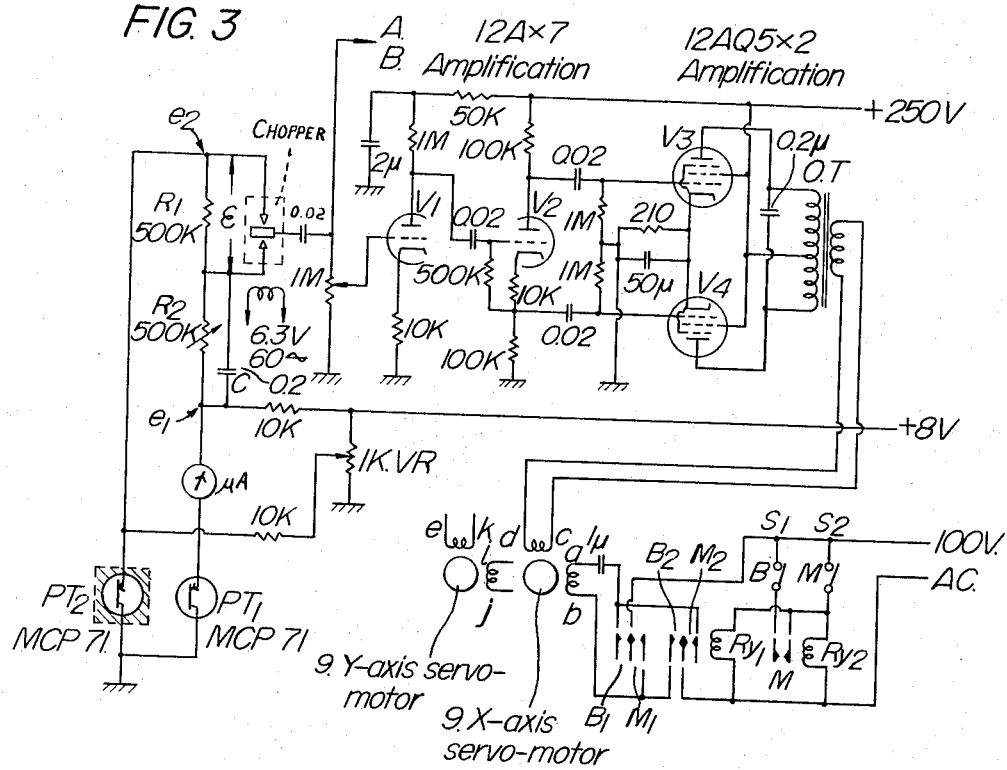
FIG. 3 is a circuit diagram of an electrical means for driving the automatic tracking means.

The automatic tracking apparatus is constructed, as shown in FIG. 1, with a substantially square platform 1 and two light sources of tubular infra-red ray lamps 2 being disposed closely along and above the adjacent sides of said platform, and filters 3 disposed inside in parallel relationship with the lamps (these filters are intended for shielding rays of unnecessary wave lengths from the light sources in order not to impart unusual sensations to the test animal) and furthermore, with X-axis and Y-axis automatic tracking means disposed on the other adjacent sides of the platform respectively for tracking the movements of the test animal. Thus, the space above the platform 1 is surrounded by the pair of light sources and the pair of automatic tracking means. (A test mouse is placed on the surrounded platform which is covered with a transparent cover, the surrounded area being the field for the mouse to move around.) At one end of the frame 4 of each automatic tracking means is mounted, as shown in FIG. 2, a potentiometer 5 having a grooved pulley 6 mounted on the shaft thereof. At the other end of the frame 4 is mounted a servo motor 9 to which a tachogenerator is directly connected, and a grooved pulley 10 is mounted on the shaft of said servo motor 9. A light receiver 11 includes a lens 12, a photosensitive element PT$_1$ (a photo-transistor is used in this example) disposed at the focus of said lens, and another like element PT$_2$ disposed adjacent to PT$_1$, and is fixed to a supporting frame 14, and is supported by grooved pulleys 15 secured to said supporting frame for free sideways movement along a guide plate 16 secured to said frame 4. An endless wire 17 is placed around the grooved pulley 10 through a grooved guide pulley 7, the grooved pulley 6, and a grooved guide pulley 8, and said wire is fixed to the light receiver 11. Thus, the rotation of the servo motor 9 will cause the wire to travel and the travelling wire will move the light receiver 11 towards the left and the right and at the same time will be able to rotate the potentiometer 5. In the above-mentioned structure, the extent to which the light receiver 11 receives the rays from the light source 2 corresponds to a cylindrical, parallel beam having a cross-section substantially equal to the aperture of the lens 12 which is shown in dotted lines. If the output voltage of PT$_1$ at the time a mouse is in a status to partially interrupt the beam as shown in FIG. 1 is established as the standard value (the preset value), then the amount of the interrupted rays in the rays received by the light receiver 11 will fluctuate with the travel of the mouse, resulting in the fluctuations in the output voltage of PT$_1$. In this case the light receiver 11 is arranged in such a manner that it will be able to move automatically in a manner that the output voltage of PT$_1$ may always maintains the standard value, the light receiver 11 will be able to follow the movements of the mouse. Now, the construction of the electric means which drives this automatic tracking means is represented by a circuit diagram as shown in FIG. 3, and the said electric means is provided for each of the automatic tracking means for the axis X and the axis Y, and is actuated in such manner that the differential voltage ($e_1 - e_2$) between the output voltage $e_1$ produced by the receipt of light by PT$_1$ and the reference voltage (the preset value) $e_2$ is taken out as the voltage $\epsilon$ at the terminals of R$_1$ through a voltage dividing circuit which is composed of R$_1$, R$_2$ and C. This voltage $\epsilon$ is converted into an alternating current of 60 cycles by a chopper and thereafter is amplified by V$_1$, V$_2$ and V$_3$, V$_4$ and is fed to the servo motor through an output transformer. However, the servo motor 9 is connected beforehand so that it will be able to drive the light receiver 11 in the direction in which the voltage $\epsilon$ is decreased, and that the motor will stop its rotation at the position where the voltage $\epsilon$ becomes zero. Thus, the tracking function is accomplished. The aforementioned PT$_2$ (surrounded by parallel oblique lines in FIG. 3) is made not to receive light, and it is disposed close to PT$_1$ and is adapted to function in such manner that even when there is a considerable change in ambient temperature, PT$_2$ will compensate for the resultant change in the characteristic of PT$_1$ and preserve the prearranged function of PT$_1$ so that the status of following will not fluctuate. The voltage dividing circuit composed of R$_1$, R$_2$ and C which is inserted in the input circuit of the chopper has a differential characteristic and acts to improve the rising characteristic of following, but R$_2$ is adjusted and set to perform the role of a brake at the cessation of the following movement. In case the light receiver 11 should miss following the movement of the mouse, either S$_1$ or S$_2$ in FIG. 3 is actuated so that the following will be resumed. This actuation of S$_1$ or S$_2$ will be described below. In the normal status of following, the energizing coil for the servo motor is energized by the current from the 100-volt alternating power source through the break contact B$_1$ of the relay R$_{y1}$, the 1 μf. condenser and the energizing coil a–b and further through the break contact B$_2$ of R$_{y1}$. If the light receiver 11 should miss following, then the said receiver 11 will travel towards the limit switch S$_2$ (the make contact, see FIG. 1) disposed at one end of the automatic tracking apparatus, and will press S$_2$ causing it to be actuated with subsequent joint actuation of R$_{y1}$ and R$_{y2}$. The energizing coil of the servo motor is thus energized by the current which passes through the make contact M$_1$ or R$_{y1}$, the energizing coil b–a, 1 μf. condenser, and through the make contact M$_2$ of R$_{y1}$, with the result that the direction of the rotation of the servo motor is reversed, and accordingly the light receiver 11 will travel towards the other end to search out the location of the mouse. On the other hand, the switch S$_2$ is by-passed through the intermediary of the make contact of the relay R$_{y2}$ and the limit switch S$_1$ (a break contact). As a result, even after the circuit of S$_2$ has been opened, both R$_{y1}$ and R$_{y2}$ maintain their operating status and the reverse rotation of the servo motor is accordingly maintained, thereby effecting subsequent following. If, during this period, another missing of following should occur, the light receiver 11 will travel towards the switch S$_1$ (see FIG. 1), and by actuating this switch, the light receiver 11 will cut the above-mentioned self-sustaining circuit, with the result that both R$_{y1}$ and R$_{y2}$ will be restored to their original operating status and again the direction of energization will be resumed and thus the original direction of following will be restored. As described above, each time the following is missed the servo motor will reverse its rotation at the ends of the searching movement and thus continuous following is attained.

Figure 4:
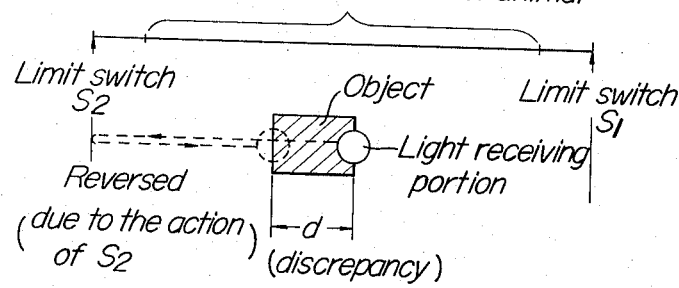
FIG. 4 is a diagram explaining the reason why the discrepancies of the locus of movement of an animal takes place.

In such case, however, there occurs an intermediary portion in the recording which is not the result of the actual tracking. Let us assume that the test is now under way in such manner that the light receiver carries out tacking of the subject animal by catching it at its right side as illustrated in FIG. 4. If, for any reason (for example, when the animal takes a leap), the light receiver loses the subject for a moment, the light receiver will naturally tend to travel to the left. Upon reaching the end, however, the light receiver will press the limit switch S$_2$ and thence the light receiver will begin retracing its path rightward as has been discussed above, and will catch the subject again at its left side. Thus, the subsequent portions of the test will be carried out. However, the discrepancy (d) due to the shift of the portion being followed as illustrated in FIG. 4 takes place. A corrective measure for such undesirable false recording is provided in the apparatus of the present invention.

Strictly speaking, such discrepancy or false recording (d) is associated with the size, configuration, etc. of the animal to be tested and, therefore, will not necessarily occur in a constant amount. However, in case the subject to be tested is confined to a certain type of animal, for example, if only mice are to be tested, such discrepancy (d) in the locus may be regarded as substantially constant. The device of the present invention, therefore, effects correction of such discrepancy of tracking which will occur when the side of the subject to be caught changes to the opposite side by setting up a certain amount of discrepancy prior to the test and by shifting the origin of the record by this amount.

Figure 5:
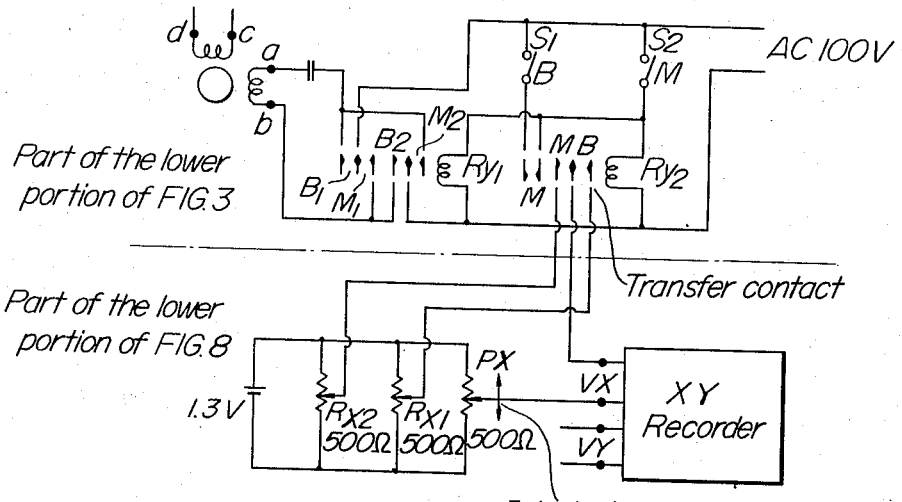
FIG. 5 is a circuit diagram of the portion of an apparatus of the present invention effecting the correction of the discrepancies of the locus of movement of animal.

In FIG. 5, the upper half of the drawing shows the circuit for reversing the direction of tracking shown in FIG. 3, while the lower half of the drawing shows a bridge circuit for generating input signals of the X–Y recorder—displacement (coordinate) signals. However, a transfer contact is additionally provided for R$_{y2}$ although this not shown in FIG. 3. In the bridge circuit also, two contacts R$_{x1}$ and R$_{x2}$ are provided as R$_x$.

When R$_{y2}$ is actuated by the energization of S$_2$, as described above, the reference voltage (the origin of coordinate) is switched from R$_{x1}$ to R$_{x2}$ by the said transfer contact, displacing the origin of the X–Y recorder, and thereby effecting correction of the discrepancy which has taken place. It is to be noted, however, that R$_{x2}$ is set (semi-fixed) so as to be shifted in advance with respect to R$_{x1}$ by an appropriate amount of correction selected. For example, in case tracking is interrupted in the X axis, the uncorrected record and the corrected record are shown for comparison in FIG. 6.

Of course, such correction as has been described can be made in both the X and Y axes.

Figure 7:
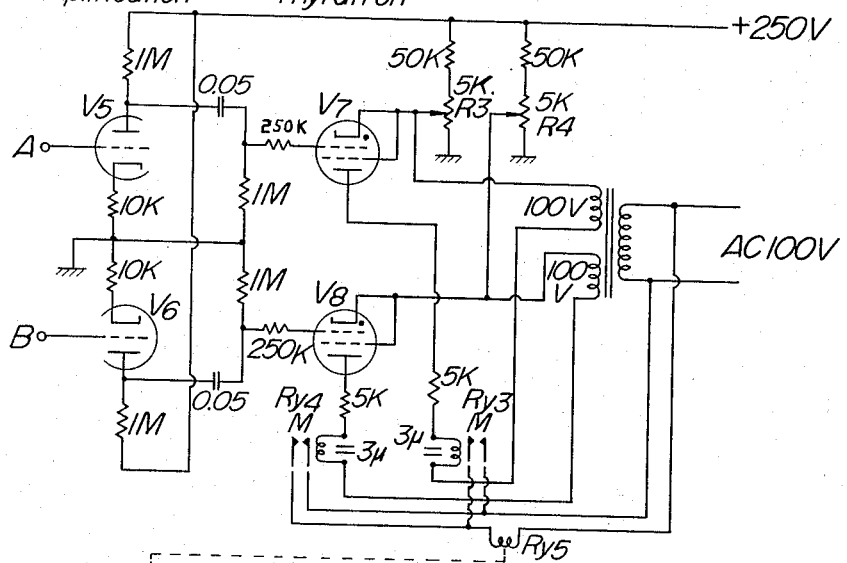
FIG. 7 is a circuit diagram of a tracking status monitoring means.

Next, the following status monitoring means will be described. This means is intended to automatically perform constant monitoring of whether or not the aforementioned normal following is being carried out, and also to automatically stop the recording operation or measuring operation of each means, in case the following is ever missed, only for the period the following is being missed. This is an electric means represented by a circuit diagram as shown in FIG. 7.

So long as the following is being normally performed, the afore-mentioned voltage ε is maintained at a relatively small level. In case the following is ever missed, the incident light beam to $PT_1$ becomes maximum, causing an abnormal increase in the voltage ε. In order to automatically sense this condition, the respective voltages at points A and B (since both driving electric circuits for the axis X and the axis Y are completely identical with each other, FIG. 3 is used in common, and the take-out point in the automatic following means for the axis X is shown as point A, while the take-out point in the automatic following means for axis Y is shown as point B) are taken out and they are led respectively to $V_5$ and $V_6$ which are shown in FIG. 7 and are amplified. Their output voltages are led to $V_7$ and $V_8$ (Thyratron), but the cathodes of $V_7$ and $V_8$, respectively, are biased by the voltages set by $R_3$ and $R_4$, and so long as normal following is being conducted, neither $V_7$ nor $V_8$ is actuated. However, in case the following is missed, for example, when missing of following occurs in the automatic following means for the axis X, the output voltage of $V_5$ will increase in such manner as has been described above, and this will cause $V_7$ to be actuated and, as a result, the relay $R_{y3}$ which is inserted in the anode circuit of $V_7$ is actuated. Likewise, if a missing of following occurs in the automatic following means for axis Y, $R_{y4}$ will be actuated in turn. Whichever of $R_{y3}$ and $R_{y4}$ is actuated, however, the corresponding contact will be unmistakably closed resulting in the actuation of $R_{y5}$. This will actuate, through its group of contacts which are shown in the drawings, the undermentioned respective means which in turn will work together to prevent erroneous recording:

The pen-lift means of the X–Y recorder,
The pen-lift means of the autographic oscilloscope for recording velocity,
The pen-lift means of the autographic oscilloscope for recording acceleration,
The short-circuit of $V_{24}$ (6AU6)—$G_1$ of the accumulated moved distance measuring circuit.

Next, the movement locus depicting means will be described. This is a means to accurately and clearly depict the locus of the movements of the test mouse. The movements of the mouse on the platform are, as has been described, separately followed by the automatic following means for the axis X and the axis Y. However, both tracking means are provided, as shown in FIG. 2 and FIG. 8, with a potentiometer 5 (the one for the automatic tracking means for the axis is hereinafter referred to as $P_x$, and the one for the automatic tracking means for the axis Y is hereinafter referred to as $P_y$). These potentiometers will rotate with the displacement of the light receivers 11, so that they can produce voltages $V_x$ and $V_y$ which are proportional to the displacement (coordinate) of the light receivers. (As shown in FIG. 8, $P_x$ and $P_y$ together with $R_x$ and $R_y$ form bridge circuits, respectively, which have 1.3 v. mercury cells as their power sources. $R_x$ and $R_y$ are semi-fixed resistors which change the balancing points (the origins of coordinates) of respective bridges, but normally they may be set at approximately the mid-point.)

By feeding $V_x$ and $V_y$ thus obtained to the X and Y input terminals, respectively, of the X–Y recorder (commercially available), a most accurate and clear diagram of the actual locus of the movement of the mouse on the plane can be reproduced and depicted.

Next, the moving velocity measuring and recording means will be described. This is a means to convert the velocity of the movements of the mouse into a voltage and to record its variation in connection with a period of time. More specifically, this is a means to obtain the true velocity of movement of the mouse based on the output voltage proportionate to the velocity through the tachogenerator directly connected with the servo-motor in each of the automatic tracking means for the axes X and Y as described above. In other words, this is a means to obtain the true moving velocity based upon the voltage proportionate to the component of the automatic tracking means for the axis X and to the component of the automatic tracking means for the axis Y.

The principle of this means is that by energizing the exciting windings of the tachogenerators in the automatic tracking means for the axis X and axis Y by the same alternating current power source (400 cycles sinusoidal wave alternating current power source), and by overlapping respective output voltages proportionate to respective velocities (likewise, 400 cycles sinusoidal wave) with 90 degrees phase shift, absolute values of velocities are measured independently of the directions of the movements of the mouse. The reason why the said principle holds good is as follows:

If the output sinusoidal wave voltage of the tachogenerator in the automatic following means for the axis X is denoted by $e_x$, $$e_x = E_x \sin \omega t \qquad (1)$$

Likewise, the output sinusoidal wave voltage $e_y$ of the tachogenerator in the automatic following means for the axis Y is expressed as:

$$e_y = E_y \sin \omega t \qquad (2)$$

Now, if the phase of the output voltage of the tachogenerator in the automatic following means for the axis X is advanced by 90 degrees, $$e_x = E_x \cos \omega t \qquad (3)$$

By adding the Equations (2) and (3), $$e_x + e_y = E_x \cos \omega t + E_y \sin \omega t$$

Now, if this composite voltage is expressed as $$e = E \sin (\omega t + \varphi),$$

$$E \sin (\omega t + \varphi) = E \sin \omega t \cdot \cos \varphi + E \cos \omega t \cdot \sin \varphi$$

Accordingly, $$E \sin \varphi = E_x, \; E \cos \varphi = E_y$$

Therefore, $$E^2 \cos^2 \varphi + E^2 \sin^2 \varphi = E^2_y + E^2_x$$

$$\therefore E^2 = E^2_x + E^2_y$$

$$\therefore E = \sqrt{E^2_x + E^2_y}$$

Thus, the amplitude E of the composite output voltage is now represented by the composition of the output amplitudes $E_x$ and $E_y$ of the tachogenerators for X and Y by the rectangular coordinate axes, in other words, the amplitude is represented by a voltage proportionate to the true velocity.

Now, the circuit of this means will be described. In FIG. 9, the circuits including $V_9$ through $V_{13}$ represent the CR oscillating circuit and also the power amplifying circuit for supplying sine wave current of 400 cycles to the exciting windings of the tachogenerators. (The said 400-cycle sine wave current may be replaced by, for example, a 500-cycle or 300-cycle sine wave current. The point is that the frequency should be great enough to meet the variation of the movement velocity of the mouse.) Through these circuits, power is supplied to the exciting windings $e \cdot f$ and $m \cdot n$ of the tachogenerators $T_{GX}$ and $T_{GY}$ of the automatic following means for the axis X and the axis Y via the output transformer (See FIG. 8). Next, voltages proportionate to the rotational velocity of the tachogenerators (400-cycle sine wave) are taken out from their respective output terminals $g \cdot h$ and $o \cdot p$. However, their phases are shifted with accuracy through the CR phase shift circuit connected to the terminals $g \cdot h$ in such a manner that the difference in phase between them may be kept at 90 degrees. Also, the amplitudes of these two voltages are adjusted by $R_5$ and superposed. This composite voltage $e_3$ is first amplified by $V_{14}$ and $V_{15}$ and then is rectified by a diode, and after being taken out through $V_{16}$, it is smoothed. From the above descriptions it is clear that the direct current output voltage $e_4$ obtained in this way is proportionate to the velocity of the movement of the mouse. This output voltage $e_4$ passes through a D.C. amplifier and is recorded by the autographic oscilloscope (such as an electromagnetic oscilloscope, direct recording oscilloscope and like recorders. This will hold true throughout the rest of the specification).

Next, the movement acceleration measuring and recording means will be described. This is a means to obtain the degree of acceleration by differentiating the velocity signal $e_4$ obtained in such manner as has been described in the above. However, this means is similar in nature to the differential operation circuit used commonly in analog computers, and consists of a direct current amplifier including $V_{17}$–$V_{21}$, and an input condenser $Ci$ and a feed-back resistor $Rf$, as shown in FIG. 10. The output $e_5$ obtained by this circuit travels through the D.C. amplifier and is recorded by the autographic oscilloscope.

Next, the moved distance measuring and recording means will be described. The velocity signal obtained in such manner as has been described is led to an integrating circuit to obtain an output signal proportionate to the moved distance, and this output signal is further led to a digitalizing circuit to convert it into a number of pulses generated in proportion to the moved distance, and by conducting accumulated counting of the number of the pulses with an electric counting means (an electromagnetic counter in this example), the moved distance is expressed as a numeral value and is recorded as such. The expressions representing the actions during this process are shown in FIG. 9. (Input velocity signal is shown in the shape of rectangular wave to simplify the drawings.) Now, a detailed explanation of the circuit of the moved distance measuring and recording means will be made. The sinusoidal composite voltage (whose amplitude is in proportion to the velocity) $e_3$ (FIG. 9) which is described in connection with the movement velocity measuring and recording means is amplified by $V_{22}$ and $V_{23}$ shown in FIG. 11, and is led to the next voltage integration circuit. (The integration circuit is a system in which a 0.1 $\mu f$. Mylar condenser in the anode circuit is charged by utilizing the constant current characteristic of the anode current in the pentode $V_{24}$.) A good integration characteristic of $V_{24}$ is obtained by the selective use of a bulb which has an excellent cut-off characteristic and an excellent linearity in the vicinity of the cut-off point from among a group of bulbs of a similar type. $R_6$ is a semi-fixed resistor for regulating the cut-off point. The anode output voltage of $V_{24}$ is amplified by $V_{26}$ through the intermediary of $V_{25}$ (cathode follower), and is guided to the Schmidt circuit formed by $V_{27} \cdot V_{28}$. The Schmidt circuit is actuated when the grid voltage of $V_{27}$ has exceeded the threshold level (normally, $V_{27}$ maintains the "off" state, and $V_{28}$ the "on" state. However, with a rise of the grid voltage of $V_{27}$, the states of $V_{27}$ and $V_{28}$ are reversed so that $V_{27}$ will assume the state of "on" and $V_{28}$ the state of "off"), and a positive pulse is transferred from the anode of $V_{28}$ to $V_{29}$ (thyratron) of the next stage causing $V_{29}$ to be actuated instantaneously. (The power at the time of the said actuation consists primarily of the accumulated electric charge in a 2 $\mu f$. condenser inserted in the anode circuit of $V_{29}$.) Thus, the relay $R_{y6}$ of the anode circuit of $V_{29}$ is actuated and will close the two pairs of contacts for one moment. By one of these pairs of contacts, one digit of the electromagnetic counter is advanced. At the same time, another pair of contacts during this moment discharges the accumulated charge in the integrating condenser (0.1 $\mu f$. Mylar) and restores the initial status of the integrating circuit. By a series of actions as described above, the velocity signal is integrated and digitalized and is integratedly counted as the accumulated moved distance in the electric counting means (in this example, an electromagnetic counter is used). An electromagnetic counter having a reading contact is used, and this is coupled with a printing type recording means (in the example, an ordinary printer is used) so that automatic printing of outputs occur at predetermined intervals of time.

Figure 13:
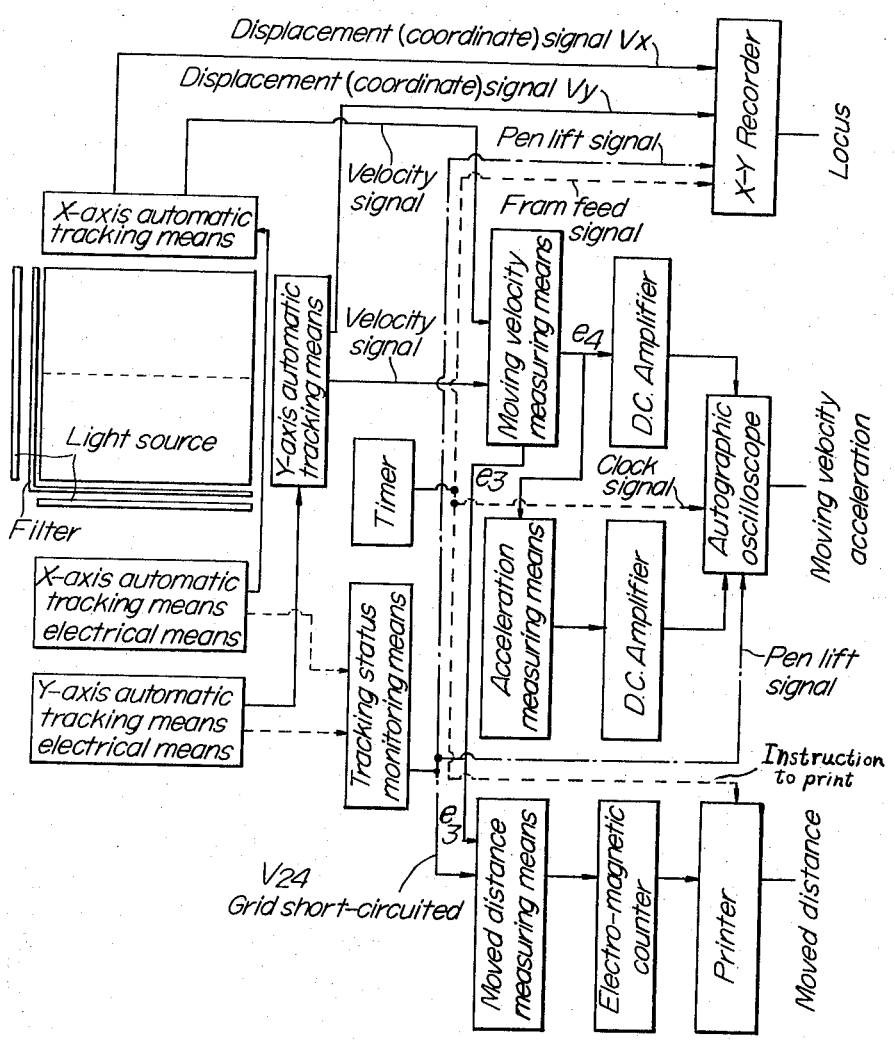
FIG. 13 is a diagram of the entire apparatus.

Next, the overall construction of the apparatus of the present invention will be described by reference to the diagram. In FIG. 13, the automatic following means for the axis X and the axis Y are driven by their respective electric circuits, as has been previously discussed. By the respective following actions, the potentiometers are rotated, and signals $V_x$ and $V_y$ in proportion to the displacement (coordinate) are taken out. These signals are led to the X–Y recorders. After they are composed, a diagram indentical with the locus of movements is depicted. Also, velocity signals at the time of following in the respective automatic following means are taken out. These signals first enter the movement velocity measuring means where they are composed and converted into the movement velocity ($e_4$) independently of the directions of the mouse's movements, and via the direct current amplifier, they are successively recorded by the autographic oscilloscope. The said composed signal $e_4$ is, at the same time, guided to the acceleration measuring and recording means, and via the direct current amplifier, it is recorded by the autographic oscilloscope as the acceleration. Also, on the other hand, the signal $e_3$ in the velocity measuring and recording means is guided to the moved distance measuring means where it is digitalized as the moved distance and is integratedly counted by the electromagnetic counter. The result of the counting is recorded by the printer.

The timer shown in the drawings is for controlling the time program of these recordings. By presetting the timing, it effects actions such as strip feeding of the X–Y recorder at predetermined intervals of time, clocking (time marking) for the autographic oscillograph and automatic printing by the printer (introduction of the instruction to print), so that the timer may help with a clear comparison of the timing of the records obtained. In this example, a timer which is commercially available is used.

The following status monitoring means is actuated only in case the following is missed, upon receiving electric signals from respective automatic following means for the axis X and the axis Y. This monitoring means actuates the pen-lift means of the X–Y recorder, the pen-lift means of the autographic oscilloscope, and the short-circuiting of the $V_{24}$ (6AU6) grid for the purpose of avoiding a possible error in the records taken.

The maximum following speed of the tracking means is 60 cm./sec., which is a speed which permits perfect following of the quick movement of a small animal. Acceleration at the time of following, and the braking at the time of a sudden stop of movement are satisfactorily conducted.

When diagrams of loci obtained by prior art methods and by the present method are compared, it is apparent that there are marked differences in the clearness and accuracy in the depicted lines of movement between those by the apparatus of the present invention and those by other methods. Not only that, the present apparatus has an excellent capacity for performing automatic depiction continuously for a desired length of time.

Next, an example of the recorded movement velocity, acceleration and moved distance of the movement of the mouse obtained by the apparatus of the present invention is shown in FIG. 14. The illustration shown in the upper portion of FIG. 14 is the record of velocity in which the velocity is expressed in cm./sec. on the vertical axis and the length of time is shown in seconds on the horizontal axis. The illustration shown in the middle portion is the record of acceleration, with the acceleration being indicated in cm./sec.$^2$ on the vertical axis and the length of time being indicated in seconds on the horizontal axis. At the bottom, the moved distances are registered in printed numbers in cm. for every 10 seconds. From these data, an overall analysis of the movements of the mouse can be made.

As has been discussed, the apparatus of the present invention is by far superior to the prior art in the clearness of the depicted lines of movement. Since, in the prior art, the effects of drugs have been evaluated based upon an indistinct diagram of lines of movements and an inaccurate record of the amount of movements, those prior apparatuses have been quite imperfect for the observations of spontaneous basic movements of animals as a means of studying the actions of drugs on the central nervous system of the animals to which such drugs are administered. The apparatus of the present invention has made it possible to conduct more detailed analysis and research of the actions of such drugs. More specifically, since this apparatus enables automatic measurement and recording of the velocity, acceleration, and moved distance of the movements of an animal in addition to the depiction of the locus of its movements, not only more detailed research on the actions of the existing drugs of this sort becomes possible, but also detailed information can be obtained on the actions of the drugs which may be developed or invented in the future in the study to know to which of the existing drugs the new drugs are similar in the actions or to know if the actions of such new drugs are completely different from the actions of the known drugs. Thus, the apparatus of the present invention is excellent in that it can provide quite useful and valuable information in the studies of drugs of this sort.

In the above, although the present invention has been described in connection with the movement of a mouse, it should be apparent that the movement of any other light shielding bodies in general may also be automatically recorded.

What we claim is:

1. An apparatus for automatically measuring the movement of an animal comprising: two linear light sources so disposed as to form two coordinate axes, two automatic tracking means for generating electrical signals representing the coordinates of said animal disposed in such a manner that each tracking means may face one of said light sources and having light receivers adapted to travel in parallel with said light sources to which they face, means for moving said light receivers in response to movement of said animal, said two light sources and said two automatic tracking means defining a field of movement for said animal, and a recorder for recording continuously the positions of said animal in response to said electrical signals.

2. An apparatus for automatically measuring the movement of an animal described in claim 1, wherein said automatic tracking means are equipped with a servo motor coupled directly to a tachogenerator and with a potentiometer.

3. An apparatus for automatically measuring the movement of an animal described in claim 2, wherein said light receivers are provided with a lens and a photoelectric transducer element.

4. An apparatus for automatically measuring the movement of an animal described in claim 3, wherein said recorder is an X–Y recorder.

5. An apparatus for automatically measuring the movement of an animal described in claim 1, wherein said apparatus is provided with a movement velocity measuring means.

6. An apparatus for automatically measuring the movement of an animal described in claim 5, wherein said apparatus is provided further with an acceleration measuring means.

7. An apparatus for automatically measuring the movement of an animal as described in claim 5, wherein said apparatus is provided further with an accumulated distance measuring means.

8. An apparatus for automatically measuring the movement of an animal as described in claim 1, wherein said apparatus is provided still further with a tracking status monitor means and a timer.

9. An apparatus for automatically measuring the movement of an animal as described in claim 8, wherein said apparatus is equipped further with a movement velocity measuring means.

10. An apparatus for automatically measuring the movement of an animal as described in claim 9, wherein said apparatus is further equipped with an acceleration measuring means.

11. An apparatus for automatically measuring the movement of an animal as described in claim 9, wherein said apparatus is still further equipped with an accumulated distance measuring means.

References Cited by the Examiner

UNITED STATES PATENTS

| | | | |
|---|---|---|---|
| 2,663,282 | 12/1953 | Ingle | 119—29 |
| 3,100,473 | 8/1963 | Kissel | 119—1 |
| 3,260,236 | 7/1966 | Jones | 119—1 |

SAMUEL KOREN, *Primary Examiner.*

ALDRICH F. MEDBERY, *Examiner.*